(12) United States Patent
Lee et al.

(10) Patent No.: US 11,039,377 B2
(45) Date of Patent: Jun. 15, 2021

(54) METHOD AND DEVICE FOR RECEIVING SYSTEM INFORMATION

(71) Applicant: LG Electronics Inc., Seoul (KR)

(72) Inventors: Youngdae Lee, Seoul (KR); Sangwon Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 62 days.

(21) Appl. No.: 16/347,320

(22) PCT Filed: Nov. 3, 2017

(86) PCT No.: PCT/KR2017/012401
§ 371 (c)(1),
(2) Date: May 3, 2019

(87) PCT Pub. No.: WO2018/084630
PCT Pub. Date: May 11, 2018

(65) Prior Publication Data
US 2019/0268831 A1    Aug. 29, 2019

Related U.S. Application Data

(60) Provisional application No. 62/417,363, filed on Nov. 4, 2016, provisional application No. 62/417,362, filed on Nov. 4, 2016.

(51) Int. Cl.
*H04W 48/14* (2009.01)
*H04W 76/19* (2018.01)
(Continued)

(52) U.S. Cl.
CPC ........... *H04W 48/14* (2013.01); *H04W 48/02* (2013.01); *H04W 48/04* (2013.01); *H04W 76/18* (2018.02);
(Continued)

(58) Field of Classification Search
CPC ..... H04W 76/18; H04W 76/10; H04W 76/19; H04W 76/27; H04W 48/14; H04W 48/02; H04W 48/16; H04W 36/0055
See application file for complete search history.

(56) References Cited

U.S. PATENT DOCUMENTS

2012/0069728 A1*  3/2012  Jung ............... H04W 76/18
                                                 370/216
2014/0301344 A1* 10/2014  Lee ................ H04W 74/0833
                                                 370/329

FOREIGN PATENT DOCUMENTS

EP        3301978 A1 *  4/2018  ........... H04W 48/14
KR   10-2007-0102168     10/2007
(Continued)

OTHER PUBLICATIONS

Samsung; "System Information Signaling Design in NR;" 3GPP Draft; R2-163371; May 23-27, 2016 (Year: 2016).*

*Primary Examiner* — Elton Williams
(74) *Attorney, Agent, or Firm* — Dentons US LLP

(57) ABSTRACT

Provided are a method for a terminal to receive system information in a wireless communication system and a device supporting the method. The method may comprise: a step of entering a first radio resource control (RRC) state; a step of transmitting, to a base station, an RRC state transition request message requesting a state transition of a terminal from the first RRC state to a second RRC state, the RRC state transition request message including a cause value indicating a request for system information; and a step of receiving, in response to the RRC state transition request message, a rejection message including the requested system information from the base station with respect to the first RRC state.

15 Claims, 12 Drawing Sheets

(51) Int. Cl.
*H04W 76/18* (2018.01)
*H04W 76/27* (2018.01)
*H04W 48/04* (2009.01)
*H04W 88/02* (2009.01)
*H04W 48/02* (2009.01)

(52) U.S. Cl.
CPC ........... *H04W 76/19* (2018.02); *H04W 76/27* (2018.02); *H04W 88/023* (2013.01)

(56) References Cited

FOREIGN PATENT DOCUMENTS

| | | |
|---|---|---|
| KR | 10-2014-0097374 | 8/2014 |
| WO | 2013147499 | 10/2013 |
| WO | 2014-019217 | 2/2014 |
| WO | 20150133684 | 9/2015 |

* cited by examiner

METHOD AND DEVICE FOR RECEIVING SYSTEM INFORMATION

CROSS-REFERENCE TO RELATED APPLICATIONS

This application is the National Stage filing under 35 U.S.C. 371 of International Application No. PCT/KR2017/012401, filed on Nov. 3, 2017, which claims the benefit of U.S. Provisional Applications No. 62/417,363 filed on Nov. 4, 2016 and No. 62/417,362 filed on Nov. 4, 2016, the contents of which are all hereby incorporated by reference herein in their entirety.

BACKGROUND OF THE INVENTION

Field of the Invention

The present invention relates to a wireless communication system and, most particularly, to a method for receiving on-demand system information, by a user equipment (UE), and a device supporting the same.

Related Art

[2] In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In the discussion of NR standardization, an RRC_CONNECTED state and an RRC_IDLE state are defined by default as an RRC state, and an RRC_INACTIVE state is additionally introduced. A user equipment (UE) in the RRC_INACTIVE state performs a radio control procedure similarly to the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state.

System information refers to essential information for communications between a user equipment (UE) and a base station (BS). In 3GPP LTE, system information is divided into a master information block (MIB) and a system information block (SIB). The MIB is the most essential information, and the SIB is subdivided into SIBs-x according to importance or period. The MIB is transmitted through a physical broadcast channel (PBCH) that is a physical channel, while the SIB is transmitted as common control information through a PDCCH.

SUMMARY OF THE INVENTION

Technical Objects

Meanwhile, the number of system information blocks is continuously increasing. Since the usage of radio resources is needed for the broadcasting of system information blocks, as the number of system information blocks increases, the size of radio resources being required for the broadcasting of the system information blocks inevitably increases accordingly. In transmitting continuously increasing system information to the user equipment (UE), a method for acquiring system information that can efficiently use radio resources needs to be proposed.

Technical Solutions

According to an exemplary embodiment of the present invention, provided herein is a method for receiving system information by a user equipment (UE) in a wireless communication system. The method may include the steps of entering a first radio resource control (RRC) state, transmitting an RRC state transition request message requesting a state transition for the UE from the first RRC to a second radio resource control (RRC) state to a base station, wherein the RRC state transition request message includes a cause value indicating a request for system information, and, in response to the RRC state transition request message, receiving a reject message including the requested system information for the first RRC state from the base station.

According to another exemplary embodiment of the present invention, provided herein is a user equipment (UE) receiving system information in a wireless communication system. The UE may include a memory, a transceiver, and a processor operatively connecting the memory and the transceiver, wherein the processor may be configured to enter a first radio resource control (RRC) state, to control the transceiver so as to transmit an RRC state transition request message requesting a state transition for the UE from the first RRC to a second radio resource control (RRC) state to a base station, wherein the RRC state transition request message includes a cause value indicating a request for system information, and to control the transceiver so as to receive a reject message including the requested system information for the first RRC state from the base station, in response to the RRC state transition request message.

Effects of the Invention

A user equipment may efficiently receive system information.

DESCRIPTION OF EXEMPLARY
EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
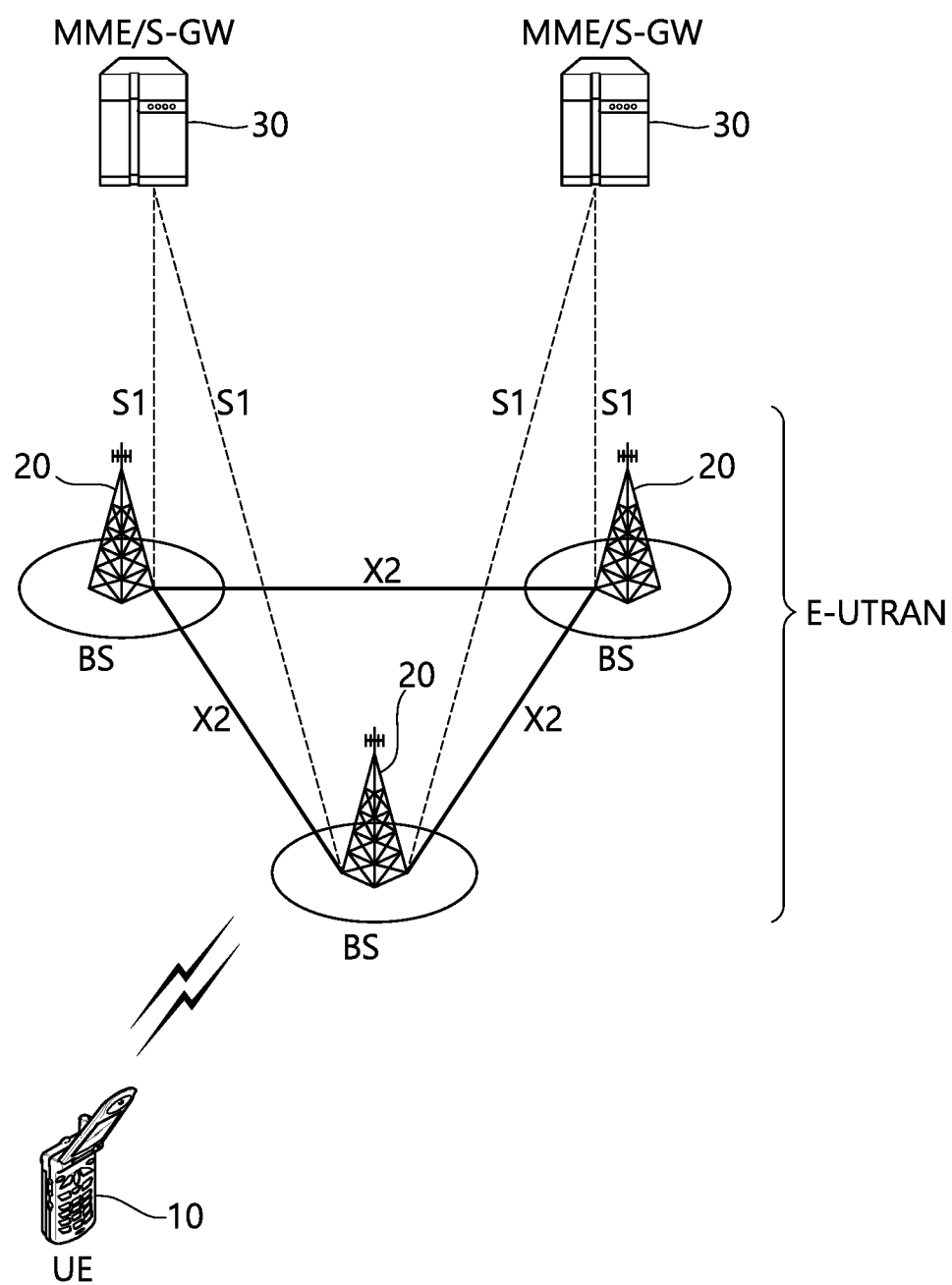
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE (10) refers to a communication equipment carried by a user. The UE (10) may be fixed or mobile, and may be referred to as another terminology, such as a mobile station (MS), a user terminal (UT), a subscriber station (SS), a wireless device, etc.

The E-UTRAN includes one or more evolved node-B (eNB) (20), and a plurality of UEs may be located in one cell. The eNB (20) provides an end point of a control plane and a user plane to the UE (10). The eNB (20) is generally a fixed station that communicates with the UE (10) and may be referred to as another terminology, such as a base station (BS), a base transceiver system (BTS), an access point, etc. One eNB (20) may be deployed per cell. There are one or more cells within the coverage of the eNB (20). A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB (20) to the UE (10), and an uplink (UL) denotes communication from the UE (10) to the eNB (20). In the DL, a transmitter may be a part of the eNB (20), and a receiver may be a part of the UE (10). In the UL, the transmitter may be a part of the UE (10), and the receiver may be a part of the eNB (20).

The EPC includes a mobility management entity (MME) which is in charge of control plane functions, and a system architecture evolution (SAE) gateway (S-GW) which is in charge of user plane functions. The MME/S-GW (30) may be positioned at the end of the network and connected to an external network. The MME has UE access information or UE capability information, and such information may be primarily used in UE mobility management. The S-GW is a gateway of which an endpoint is an E-UTRAN. The MME/S-GW (30) provides an end point of a session and mobility management function for the UE (10). The EPC may further include a packet data network (PDN) gateway (PDN-GW). The PDN-GW is a gateway of which an endpoint is a PDN.

The MME provides various functions including non-access stratum (NAS) signaling to eNBs (20), NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW (30) will be referred to herein simply as a "gateway," but it is understood that this entity includes both the MME and S-GW.

Interfaces for transmitting user traffic or control traffic may be used. The UE (10) and the eNB (20) are connected by means of a Uu interface. The eNBs (20) are interconnected by means of an X2 interface. Neighbor eNBs may have a meshed network structure that has the X2 interface. The eNBs (20) are connected to the EPC by means of an S1 interface. The eNBs (20) are connected to the MME by means of an S1-MME interface, and are connected to the S-GW by means of S1-U interface. The S1 interface supports a many-to-many relation between the eNB (20) and the MME/S-GW.

The eNB (20) may perform functions of selection for gateway (30), routing toward the gateway (30) during a radio resource control (RRC) activation, scheduling and transmitting of paging messages, scheduling and transmitting of broadcast channel (BCH) information, dynamic allocation of resources to the UEs (10) in both UL and DL, configuration and provisioning of eNB measurements, radio bearer control, radio admission control (RAC), and connection mobility control in LTE_ACTIVE state. In the EPC, and as noted above, gateway (30) may perform functions of paging origination, LTE_IDLE state management, ciphering of the user plane, SAE bearer control, and ciphering and integrity protection of NAS signaling.

Figure 2:
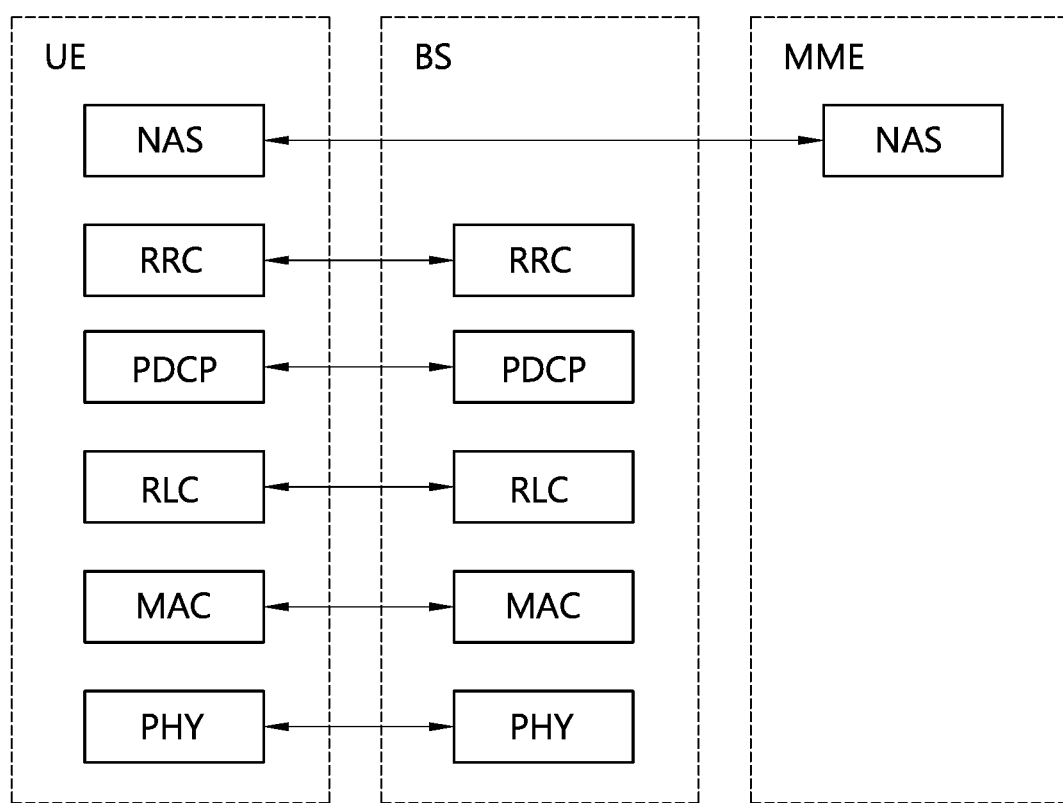
FIG. 2 shows a control plane of a radio interface protocol of an LTE system.
Figure 3:
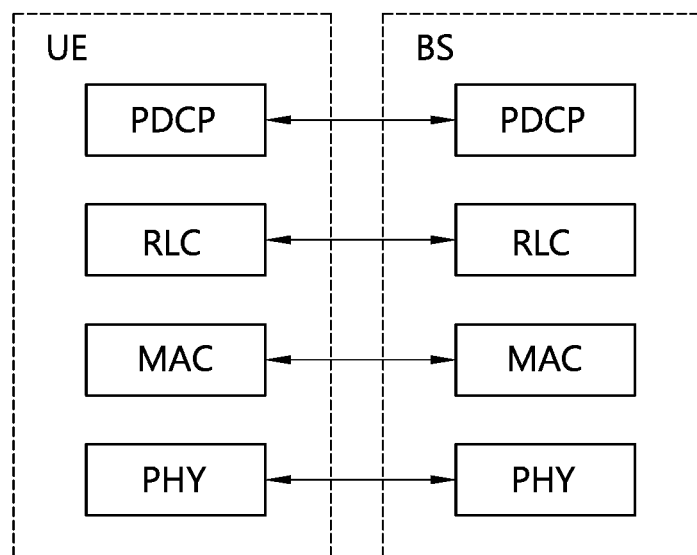
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC_connected state and an RRC_idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G network structure is described.

Figure 4:
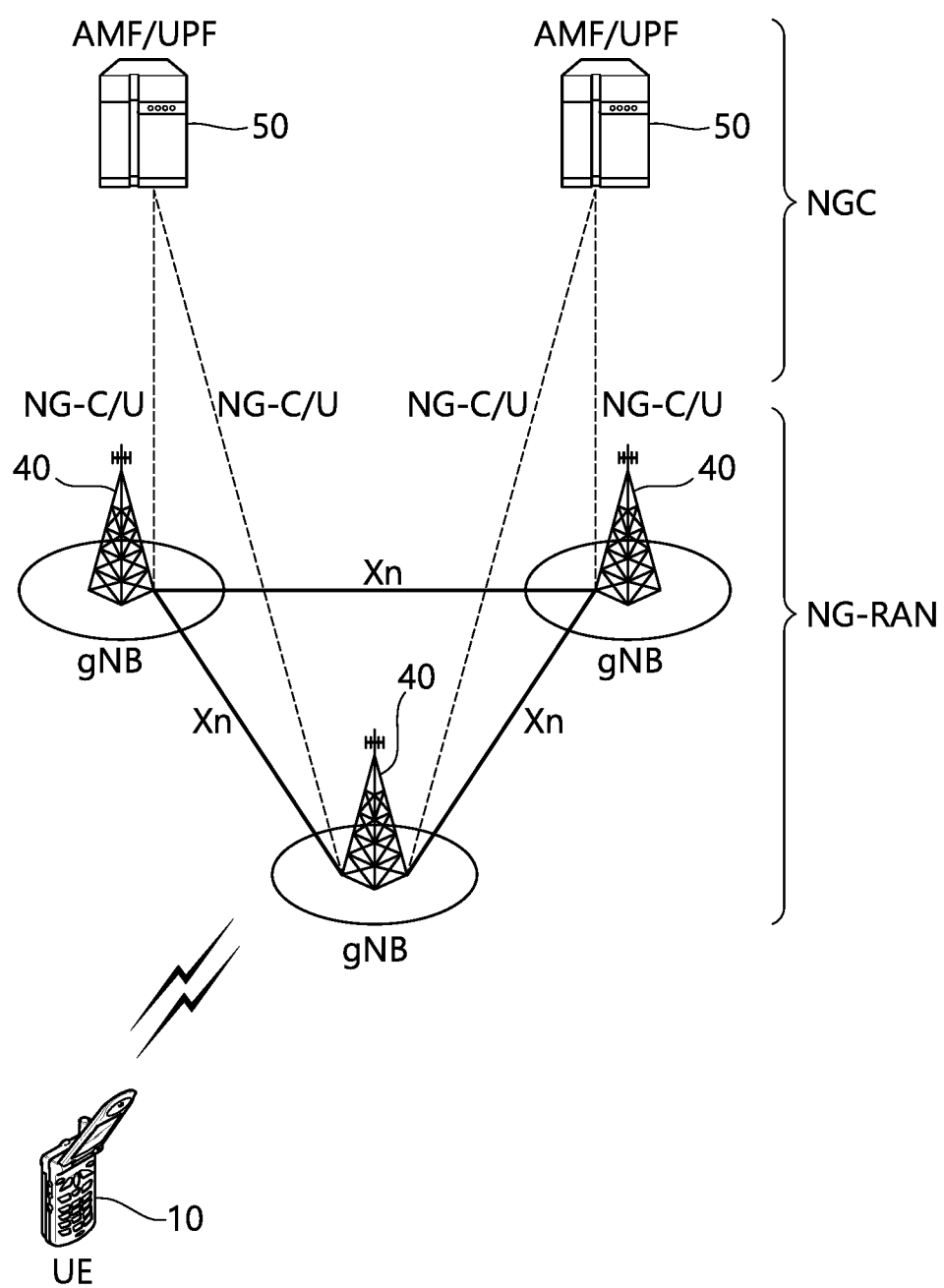
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NG-C interface, and may be connected to a UPF by means of an NG-U interface. The NG interface supports a many-to-many-relation between the gNB (40) and the AMF/UPF (50).

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and a NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

In case of a UE operating in a lightly connected mode, in order to conceal (or hide) the state transition and mobility from the core network, the MME may maintain the SI connection of an activated UE. In other words, in case of a UE operating in the RRC_INACTIVE state, in order to conceal the state transition and mobility from the Next Generation Core (NGC), the AMF may maintain an NG connection of the activated UE. In this specification, the RRC_INACTIVE state may be used as a similar concept of a lightly connected mode, a lightweight connected mode, or a semi-connected mode, and so on.

Hereinafter, system information is described.

Figure 5:
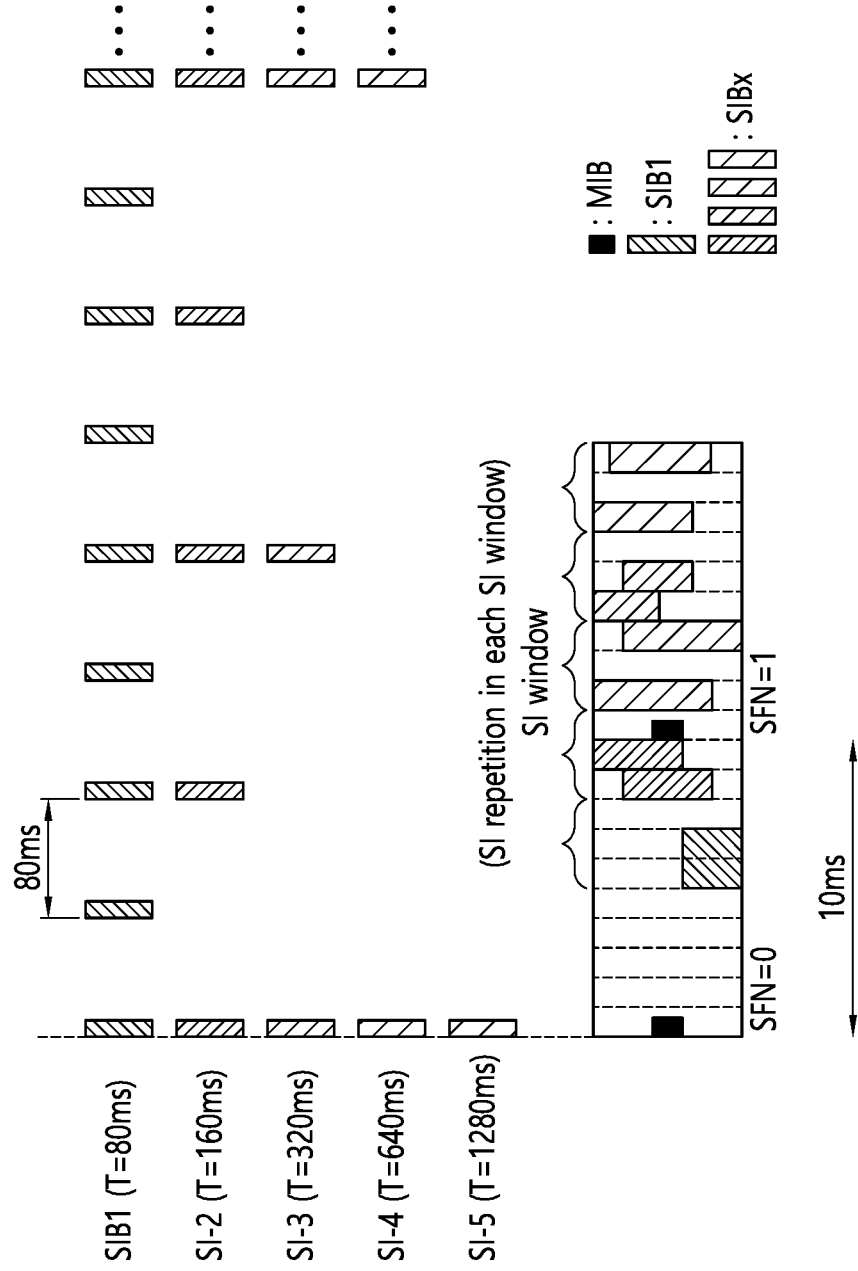
FIG. 5 shows an example of transmitting a master information block (MIB), system information block1 (SIB1), and other SIBs.

FIG. 5 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 5, an MIB message is broadcast through a BCH according to a periodicity of 40 ms, and MIB transmission is repeated in all radio frames within the periodicity of 40 ms. The UE receives a SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9. 3.0," which is described in detail.

Figure 6:
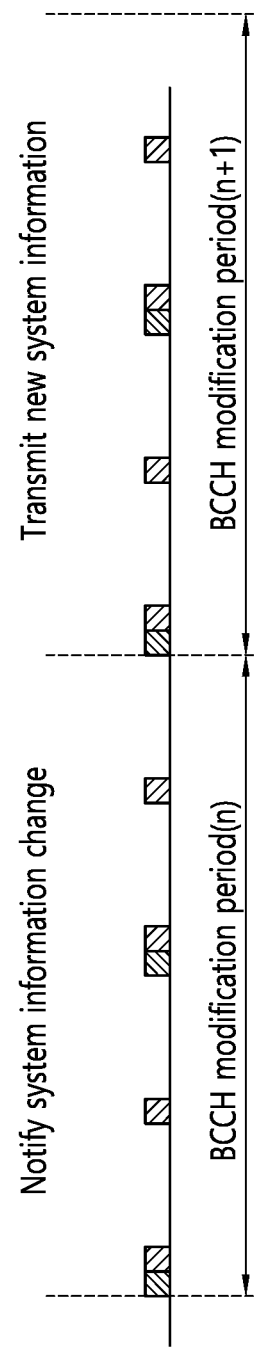
FIG. 6 shows an update of system information.

FIG. 6 shows an update of system information.

Referring to FIG. 6, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Meanwhile, the number of system information blocks is continuously increasing. Since the usage of radio resources is needed for the broadcasting of system information blocks, as the number of system information blocks increases, the size of radio resources being required for the broadcasting of the system information blocks inevitably increases accordingly. In order to resolve this problem, a new type of system information is proposed. Instead of being broadcasted by the network at all times, the new type of system information may be transmitted from the network only when the UE requests for the system information. This type of system information may be referred to as On-demand System Information (OSI).

Hereinafter, according to an exemplary embodiment of the present invention, a method performed by a user equipment (UE) for acquiring on-demand system information and a device for supporting the same.

The OSI may be delivered via broadcast signaling or dedicated signaling. The network may determine whether other SI is to be broadcasted or whether the delivery is performed via UE-specific signaling. In this specification, other SI may refer to system information that is not included in the minimum system information (MSI) that is always broadcasted by the network. The other SI may be delivered via UE-specific signaling at least in the following cases.

(1) Case 1: When a UE in RRC_IDLE enters a new CN based area (e.g., new Tracking Area)

(2) Case 2: When a UE in RRC_IDLE makes (or establishes) a RRC Connection (i.e., a state transition to RRC_CONNECTED)

(3) Case 3: When a UE in RRC_INACTIVE enters a new RAN based area (4) Case 4: When a UE in RRC_INACTIVE makes a state transition to RRC_ACTIVE (5) Case 5: When a UE in RRC_INACTIVE triggers data transmission in RRC_INACTIVE state In Case 1, a UE in RRC_IDLE may camp on a cell and may immediately trigger a CN area update. For example, the CN area update may correspond to a (tracking area update (TAU). When the UE triggers the CN area update, the UE in RRC_IDLE may transmit (or send) an RRC Connection Request message to the base station. The base station may correspond to a gNB. The RRC Connection Request message may indicate an SI request. For example, if the UE does not have the other SI for this area, the RRC Connection Request message may indicate an SI request.

In Case 2, the UE in RRC_IDLE may camp on a cell and may immediately trigger RRC Connection Establishment. For example, the RRC Connection Establishment may be triggered due to MO data or MT access. For the MT case, a paging message may inform the UE of the SI update. The paging message may trigger the SI request. Accordingly, the UE in RRC_IDLE sends an RRC Connection Request message to the base station. The system information (SI) may be updated just (or immediately) before sending the RRC Connection Request message, the RRC Connection Request message may indicate the SI request. Referring to Case 1 or Case 2, the UE in RRC_IDLE may request other SI during the RRC connection establishment procedure.

In addition, the requested SI may be signaled to the UE during the RRC Connection Establishment procedure. For example, the requested SI may be signaled to the UE via an RRC Connection Setup message. Preferably, even if the UE has not requested the SI during the RRC Connection Establishment, if other SI is updated, the base station may transmit the other SI to the UE during the RRC Connection Establishment procedure. More specifically, the base station may transmit the other SI to the UE performing (or making) RRC connection establishment.

Figure 7:
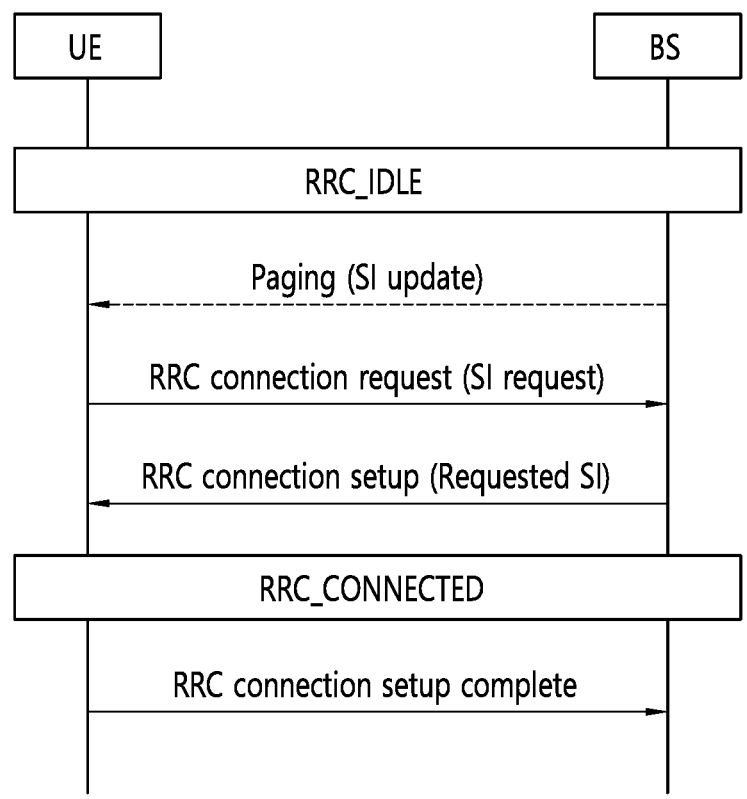
FIG. 7 shows a procedure for delivering OSI during an RRC connection establishment procedure according to an exemplary embodiment of the present invention.

FIG. 7 shows a procedure for delivering OSI during an RRC connection establishment procedure according to an exemplary embodiment of the present invention.

Referring to FIG. 7, the base station may determine whether or not to broadcast the requested SI. In this case, the RRC connection setup message may include the requested SI. Alternatively, instead of including the requested SI, the RRC connection setup message may notify the UE that the requested SI is scheduled to be broadcasted.

Preferably, the UE in RRC_IDLE may request an RRC connection only for the OSI. In this case, the UE may notify the base station that the establishment cause of the RRC connection is the SI request. Based on the cause, by transmitting an RRC connection reject message, the base station may reject the RRC connection request. More specifically, an RRC connection reject message may be transmitted instead of the RRC connection setup message. In this case, the RRC connection reject message may include the SI that is requested by the UE.

In Case 3, the UE in RRC_INACTIVE may camp on a cell, and the UE may know that it has entered a new RAN based area within the cell. Thus, the UE may trigger a RAN area update. Once the UE triggers the RAN area update while operating in the RRC_INACTIVE state, the UE in RRC_INACTIVE may be capable of transmitting a RAN Area Update message to the base station. The base station may correspond to a gNB. The RAN Area Update message may indicate an SI request. For example, if the UE does not have other SI for the corresponding area, the RAN Area Update message may indicate an SI request.

In Case 4 or Case 5, the UE in RRC_INACTIVE may camp on a cell, and the UE may immediately trigger an uplink data transmission or a downlink data transmission. Thus, the UE may trigger a RAN area update for a transition to the RRC_ACTIVE state, or the UE may directly trigger a data transmission directly while operating in the RRC_INACTIVE state. In this specification, the RRC_ACTIVE state may correspond to a similar state as the RRC_CONNECTED state. For example, the RAN area update for the transition to the RRC_ACTIVE state may be triggered via RRC Connection Re-establishment or RRC Connection Resume. An uplink data transmission or downlink data transmission with or without state transition could be triggered by a RAN area notification, which may indicate SI update.

Figure 8:
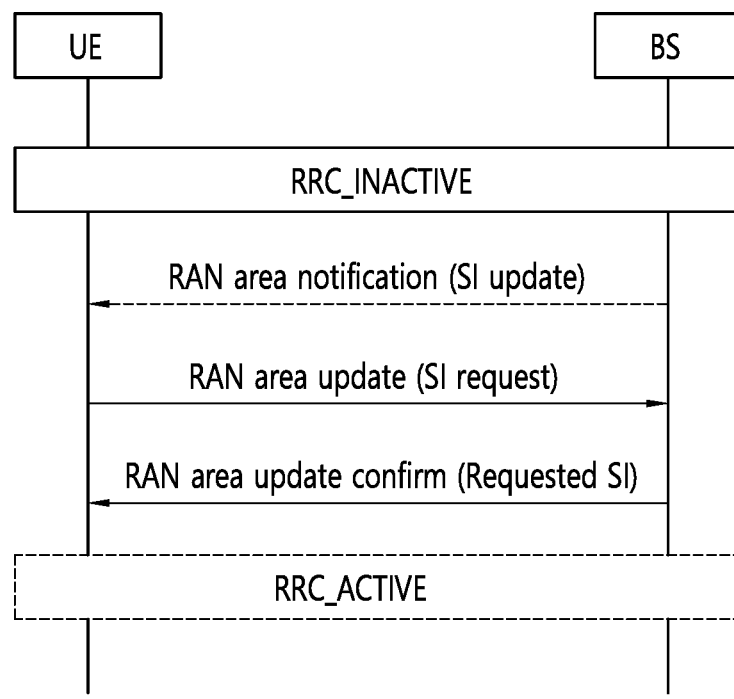
FIG. 8 shows a procedure for delivering OSI during a RAN area update procedure according to an exemplary embodiment of the present invention.

FIG. 8 shows a procedure for delivering OSI during a RAN area update procedure according to an exemplary embodiment of the present invention.

Referring to FIG. 8, when the UE in RRC_INACTIVE triggers a RAN Area Update, the UE may transmit a RAN Area Update message to the base station. The RAN Area Update message may indicate the SI request. For example, if the UE does not have other SI corresponding to this area, the RAN Area Update message may indicate the SI request. More specifically, while the UE in RRC_INACTIVE updates the RAN based area, the UE in RRC_INACTIVE may request other SI.

Meanwhile, in order to perform data transmission in the RRC_INACTIVE state, the UE in RRC_INACTIVE may transmit an SI request that is multiplexed with the uplink data. Alternatively, in order to perform data transmission in the RRC_INACTIVE state, the UE in RRC_INACTIVE may transmit an SI request that is multiplexed with a feedback on the downlink transmission. If the transmission is possible in the RRC_INACTIVE state, while the UE in RRC_INACTIVE performs uplink data transmission or downlink data reception, the UE in RRC_INACTIVE may request other SI.

Additionally, as shown in FIG. 8, the requested SI may be signaled to the UE via downlink message during the RAN area update procedure. Preferably, even if the UE does not request the SI during the RAN area update procedure, if other SI is updated, the base station may transmit the other SI to the UE during the RAN area update procedure. More specifically, the base station may transmit the other SI to the UE performing the RAN area update while operating in the RRC_INACTIVE state.

Figure 9:
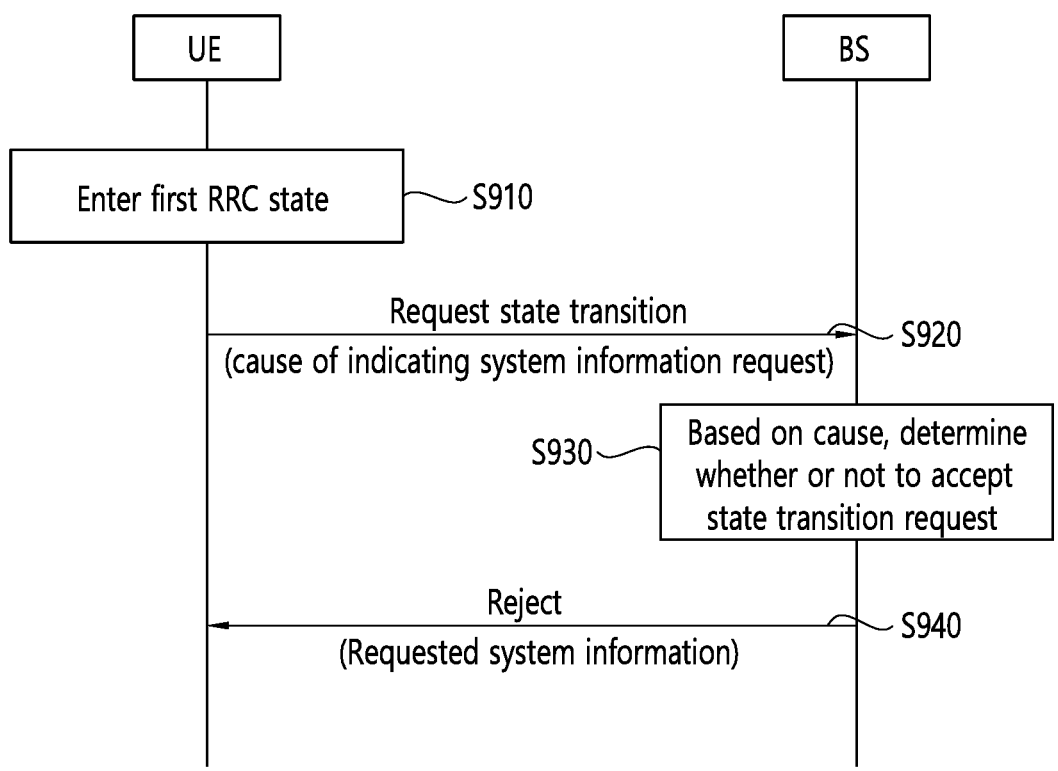
FIG. 9 shows a procedure during which the UE receives system information being included in a rejection message according to an exemplary embodiment of the present invention.

FIG. 9 shows a procedure during which the UE receives system information being included in a rejection message according to an exemplary embodiment of the present invention.

Referring to FIG. 9, in step S910, the user equipment (UE) may enter a first RRC state. The first RRC state may correspond to any one of RRC_IDLE state or RRC_INACTIVE state.

In step S920, the UE being in the first RRC state may transmit a request message to the base station. The request message may be transmitted to the base station in order to make a transition from a first RRC state to a second RRC state. The base station may correspond to a gNB. For example, in case the first RRC state corresponds to the RRC_IDLE state, in order to make a transition to the RRC_CONNECTED state, the UE in RRC_IDLE may transmit an RRC Connection Request message to the base station. For example, in case the first RRC state corresponds to the RRC_INACTIVE state, the UE in RRC_INACTIVE may transmit an RRC Connection Request message to the base station.

The request message may include a cause. For example, the cause may correspond to an Establishment Cause. The cause may indicate to the base station that the request corresponds to an OSI request. Additionally, the request message may indicate to the base station that system information is being requested.

If the UE receives a paging message or a notification message indicating that system information needs to be updated or requested, the UE may transmit the request message to the base station. The request message may indicate to the base station that the system information is being requested along with the cause.

In step S930, the base station may determine whether or not to accept the request message based on the cause.

In step S940, if the base station does not accept the request message, the base station may transmit a reject message to the UE. For example, the reject message may correspond to any one of an RRC Connection Reject message, an RRC Connection Resume Reject message, or an RRC Connection Release message. The reject message may be transmitted to the UE in order to reject transition from a first RRC state to a second RRC state. For example, if the UE in RRC_IDLE transmits an RRC Connection Request message for transitioning to the RRC_CONNECTED state to the base station, the base station may reject the request for transitioning to the RRC_CONNECTED state by transmitting an RRC Connection Reject message to the UE. For example, if the UE in RRC_INACTIVE transmits an RRC Connection Resume request message for transitioning to the RRC_INACTIVE state to the base station, the base station may reject the request for transitioning to the RRC_INACTIVE state by transmitting an RRC Connection Resume Reject message.

If the request message indicates to the base station that system information is being requested, the reject message may include system information that is requested for a first RRC state. The requested system information may be included in the reject message along with validity information of the requested system information. For example, the validity information may include at least one of a value tag, a validity time, and a validity area.

Additionally, the request system information may indicate to the UE to which state the requested system information corresponds. For example, the requested system information may indicate to the UE that the requested system information corresponds to a first RRC state. In this case, the UE may consider that the requested system information is valid only for the first RRC state. For example, in case the requested system information is valid for the RRC_INACTIVE state, the UE may consider that the requested system information is valid in all cells belonging to the same RAN based area that is used for the mobility of the UE in RRC_INACTIVE. For example, if the requested system information is valid for the RRC_IDLE state, the UE may consider that the requested system information is valid in all cells belonging to the same CN based area (e.g., Tracking area) that is used for the mobility of the UE in RRC_IDLE.

Preferably, the UE may transmit a state transition request message to the base station only for requesting system information. In this case, the state transition request message may include a cause value indicating that the cause of the request corresponds to a request for system information. If the base station receives the state transition request message including the cause value from the UE, the base station may reject the state transition request and may transmit a reject message including the requested system information to the UE. Accordingly, if the UE in the first RRC state transmits a state transition request message for requesting system information to the base station, the UE may not make a transition to the second RRC state, and the UE may receive the requested system information for the first RRC state from the base station while operating in the first RRC state.

For example, the UE in RRC_IDLE may transmit an RRC Connection Request message for only requesting system information to the base station. In this case, the RRC Connection Request message may include an Establishment Cause indicating that the cause of the RRC connection request corresponds to a system information request. If the base station receives the RRC Connection Request message including the Establishment Cause from the UE, the base station may reject the RRC connection request and may transmit an RRC Connection Reject message including the requested system information to the UE.

For example, the UE in RRC_INACTIVE may transmit an RRC Connection Resume Request message for only requesting system information to the base station. In this case, the RRC Connection Resume Request message may include a Resume Cause indicating that the cause of the RRC Connection Resume Request corresponds to a system information request. If the base station receives the RRC Connection Resume Request message including the Resume Cause from the UE, the base station may reject the RRC Connection Resume request and may transmit an RRC Connection Resume Reject message including the requested system information to the UE.

If the UE receives the reject message, the UE may maintain the first RRC state and may store the system information requested for the first RRC state.

Alternatively, if the base station receives the request message, the base station may transmit an accept message to the UE. For example, the accept message may correspond to any one of an RRC Connection Setup message and an RRC Connection Resume message. If the request message indicates to the base station that system information is requested, the accept message may include system information that is requested for a second RRC state. The requested system information may be included in the accept message along with validity information of the requested system information. For example, the validity information may include at least one of a value tag, a validity time, and a validity area. If the UE receives the accept message, the UE may make a transition to the second RRC state and may store the system information requested for the second RRC state.

Meanwhile, an essential SIB may vary depending upon the state of the UE, such as the RRC_IDLE state and the RRC_INACTIVE state. For example, cell reselection parameters may be different from one another depending upon the RRC_IDLE state and the RRC_INACTIVE state. The UE in RRC_ACTIVE does not need to acquire a cell reselection parameter from other SI. Therefore, a specific SIB needs to be considered valid only for a specific state. Thus, while the base station provides the UE with other SI that is only valid during the current state of the UE, the UE may request only the system information for only one state (e.g., the RRC_INACTIVE state). For example, if the UE makes a transition to the RRC_INACTIVE state, the UE may request system information that is valid only for the RRC_INACTIVE state, and the base station may provide system information that is only valid for the RRC_INACTIVE state. Preferably, a specific SIB existing in other SI may be valid only in one or more states. For example, the specific SIB may be valid only in the RRC_INACTIVE state. For example, the specific SIB may be valid in both the RRC_INACTIVE state and the RRC_IDLE state.

Figure 10:
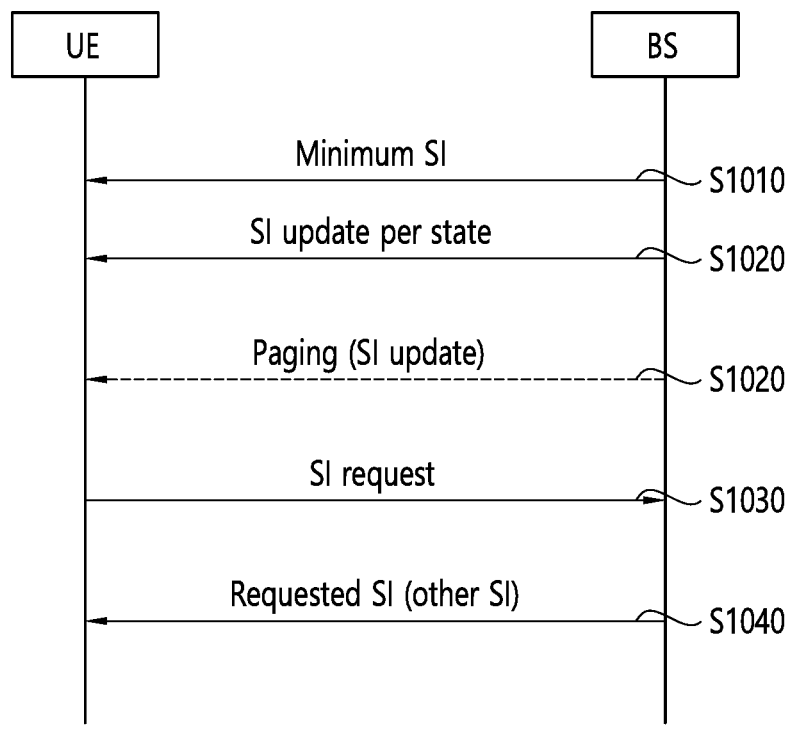
FIG. 10 shows a procedure during which the UE receives system information corresponding to a specific RRC state according to an exemplary embodiment of the present invention.

FIG. 10 shows a procedure during which the UE receives system information corresponding to a specific RRC state according to an exemplary embodiment of the present invention.

Referring to FIG. 10, in step S1010, the base station may broadcast minimum system information (SI) from a cell. The minimum SI may always be broadcasted from a cell.

In step S1020, the base station may indicate to the UE whether or not other SI is being updated for each RRC state. More specifically, in case the base station indicates an SI update, the base station may indicate for which RRC state the SI update is performed. Information on whether or not the other SI is being updated for each RRC may be indicated via a paging message, a notification message, or the minimum SI. For example, the base station may indicate to the UE whether the other SI is being updated for the RRC_IDLE state, the RRC_CONNECTED state, the RRC_ACTIVE state, or the RRC_INACTIVE state.

In step S1030, if system information needs to be requested, the UE may request the base station for the system information. If the UE detects an SI update, the UE may request the base station for the system information only when the UE is in the corresponding state. For example, if the UE in RRC_IDLE detects an update in system information related to the RRC_CONNECTED state, the UE in RRC_IDLE may not request the corresponding system information. Conversely, if the UE in RRC_IDLE detects an update in system information related to the RRC_IDLE state, the UE in RRC_IDLE may request the corresponding system information.

In step S1040, if the base station receives a system information request from the UE, the base station may transmit the requested system information to the UE. The requested system information may indicate to the UE to which state the requested system information corresponds. For example, the base station may indicate to the UE that the requested system information corresponds to any one of the RRC_IDLE state, the RRC_CONNECTED state, the RRC_ACTIVE state, and the RRC_INACTIVE state.

The UE may receive and store the requested system information. The UE may consider that the requested system information is valid only for the corresponding state.

In case of the OSI, other SI may be valid throughout (or across) multiple cells. The valid area may correspond to a mobility area, such as a Tracking area, a RAN based area, or a cell. For example, if the other SI is valid for the RRC_INACTIVE state, the UE may consider that the other SI is valid in all cells belonging to the same RAN based area that is used for the mobility of the UE in RRC_INACTIVE. For example, if the other SI is valid for the RRC_IDLE state, the UE may consider that the other SI is valid in all cells belonging to the same CN based area (e.g., Tracking area or PLMN) that is used for the mobility of the UE in RRC_IDLE.

When the base station transmits the requested system information to the UE, the base station may notify the validity area of the other SI to the UE. If the validity area of the other SI is notified to the UE, the UE may continue to store the other SI throughout (or across) cells within the validity area.

The validity area may be used not only for OSI but also for broadcast SI. If the validity area is used for broadcast SI, the minimum SI may indicate a validity area of the other SI. If the UE acquires other SI within the cell, the UE may avoid receiving other SI from another cell existing within the validity area of the other SI. Such operation of the UE may increase UE power saving performance for the broadcast SI. More specifically, the validity area of the other SI may be used not only for OSI but also for broadcast SI, and the UE may use the validity area in order to increase the power saving performance for not only the OSI but also the broadcast SI.

Figure 11:
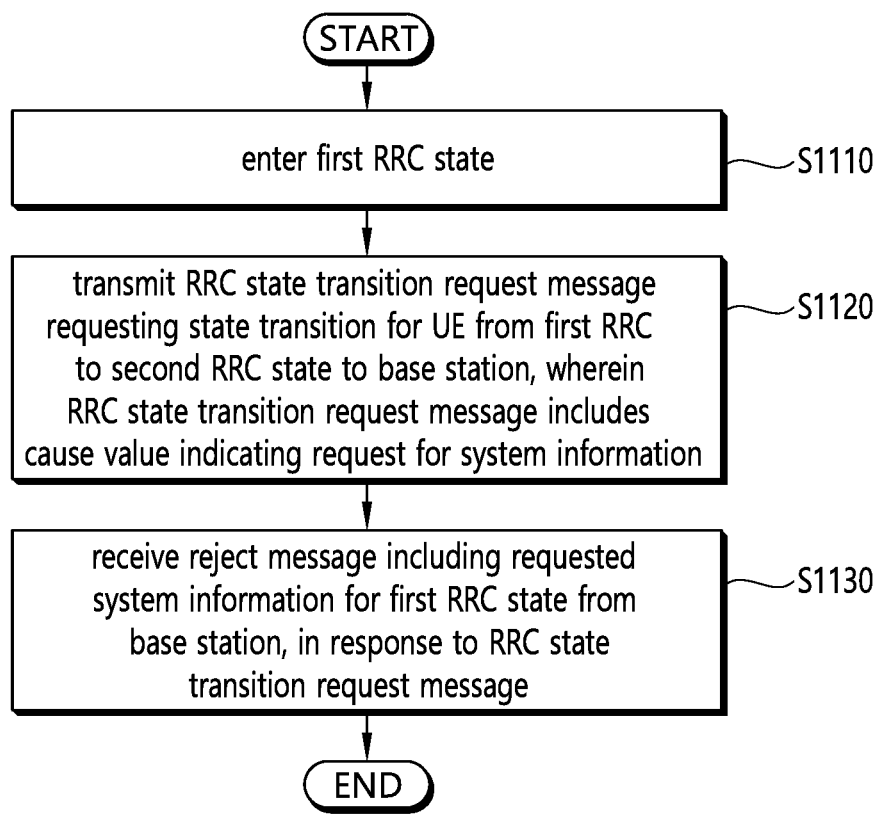
FIG. 11 is a block diagram showing a method performed by the UE for receiving system information according to an exemplary embodiment of the present invention.

FIG. 11 is a block diagram showing a method performed by the UE for receiving system information according to an exemplary embodiment of the present invention.

Referring to FIG. 11, in step S1110, the user equipment (UE) may enter a first radio resource control (RRC) state.

In step S1120, the UE may transmit an RRC state transition request message requesting a state transition for the UE from the first RRC state to a second radio resource control (RRC) state to the base station. In this case, the RRC state transition request message may include a cause value indicating a request for the system information. The RRC state transition request message may indicate to the base station that the system information has been requested by the UE. If the RRC state transition request message indicates to the base station that the system information has been requested by the UE, the reject message may include system information that is requested for the first RRC state.

The RRC state transition request message may be used for requesting system information that is related to the first RRC state.

In step S1130, in response to the RRC state transition request message, the UE may receive a reject message including the requested system information for the first RRC state from the base station.

If the RRC state transition request message includes a cause value indicating the request for the system information, the reject message may be transmitted to the UE by the base station in correspondence with the cause value.

For example, the first RRC state may correspond to the RRC_IDLE state, the second RRC state may correspond to the RRC_CONNECTED state, the RRC state transition request message may correspond to an RRC connection request message, and the reject message may correspond to an RRC connection reject message.

For example, the first RRC state may correspond to the RRC_INACTIVE state, the second RRC state may correspond to the RRC_ACTIVE state, the RRC state transition request message may correspond to an RRC connection resume request message, and the reject message may correspond to an RRC connection resume reject message.

System information included in the reject message may indicate to the UE that the system information is system information corresponding to the first RRC state.

System information included in the reject message may be considered to be valid only in the first RRC state. For example, if the first RRC state is the RRC_INACTIVE state, the system information included in the reject message is considered to be valid in cells belonging to the same radio access network (RAN) based area, and the RAN based area may correspond to an area that is used for UE mobility of the RRC_INACTIVE state. For example, if the first RRC state is the RRC_IDLE state, the system information included in the reject message is considered to be valid in cells belonging to the same core network (CN) based area, and the CN based area may correspond to an area that is used for UE mobility of the RRC_IDLE state.

Additionally, if a reject message including the system information requested for the first RRC state is received from the base station, the UE may store the requested system information for the first RRC state. In this case, the first RRC state may be maintained.

Figure 12:
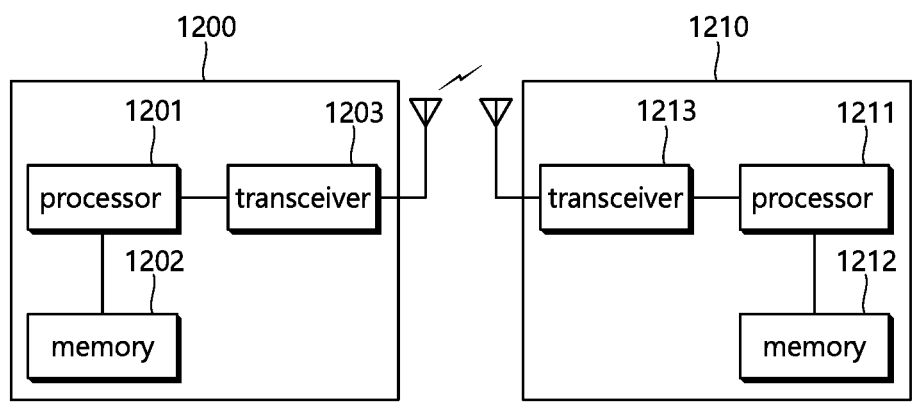
FIG. 12 is a block diagram illustrating a wireless communication system according to the embodiment of the present invention.

FIG. 12 is a block diagram illustrating a wireless communication system according to the embodiment of the present invention.

A BS (1200) includes a processor (1201), a memory (1202), and a transceiver (1203). The memory (1202) is connected to the processor (1201), and stores various information for driving the processor (1201). The transceiver (1203) is connected to the processor (1201), and transmits and/or receives radio signals. The processor (1201) implements proposed functions, processes and/or methods. In the above embodiment, an operation of the base station may be implemented by the processor (1201).

A UE (1210) includes a processor (1211), a memory (1212), and a transceiver (1213). The memory (1212) is connected to the processor (1211), and stores various information for driving the processor (1211). The transceiver (1213) is connected to the processor (1211), and transmits and/or receives radio signals. The processor (1211) implements proposed functions, processes and/or methods. In the above embodiment, an operation of the base station may be implemented by the processor (1211).

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving system information by a user equipment (UE) in a wireless communication system, comprising:
    entering a first radio resource control (RRC) state;
    transmitting, to a base station (BS), a first RRC state transition request message including a cause value which informs the BS that the system information related to the first RRC state is requested by the UE; and
    based on the cause value included in the first RRC state transition request message, receiving, from the BS, a reject message including the system information related to the first RRC state requested by the UE,
    wherein the first RRC state transition request message including the cause value is a message for requesting the system information related to the first RRC state without a state transition from the first RRC state to a second RRC state, and
    wherein a second RRC state transition request message not including the cause value is a message for requesting the state transition for the UE from the first RRC to the second RRC state.

2. The method of claim 1, wherein the first RRC state transition request message to informs the BS that the system information related to the first RRC state is requested by the UE.

3. The method of claim 2, wherein, based on the first RRC state transition request message informing the BS that the system information related to the first RRC state is requested by the UE, the reject message includes system information being requested for the first RRC state.

4. The method of claim 1, wherein, based on the cause value included in the first RRC state transition request message, the reject message is transmitted by the BS to the UE in response to the first RRC state transition request message including the cause value.

5. The method of claim 1, wherein the first RRC state is an RRC_IDLE state, the second RRC state is an RRC_CONNECTED state, the first RRC state transition request message is an RRC connection request message, and the reject message is an RRC connection reject message.

6. The method of claim 1, wherein the first RRC state is an RRC_INACTIVE state, the second RRC state is an RRC_ACTIVE state, the first RRC state transition request message is an RRC connection resume request message, and the reject message is an RRC connection resume reject message.

7. The method of claim 1, further comprising:
    based on the reject message which is received from the BS, storing the system information related to the first RRC state, wherein the first RRC state is maintained.

8. The method of claim 1, wherein the system information included in the reject message informs the UE that the system information is system information related to the first RRC state.

9. The method of claim 1, wherein the system information included in the reject message is valid only in the first RRC state.

10. The method of claim 9,
    wherein, based on the first RRC state which is an RRC_INACTIVE state, the system information included in the reject message is valid in cells belonging to a same radio access network (RAN) based area, and
    wherein the RAN based area is an area that is used for UE mobility of the RRC_INACTIVE state.

11. The method of claim 9,
    wherein, based on the first RRC state which is an RRC_IDLE state, the system information included in the reject message is valid in cells belonging to a same core network (CN) based area, and
    Wherein the CN based area is an area for UE mobility of the RRC_IDLE state.

12. A user equipment (UE) receiving system information in a wireless communication system, comprising:
- a memory;
- a transceiver; and
- a processor operatively connecting the memory and the transceiver,
- wherein the processor is configured to:
- enter a first radio resource control (RRC) state;
- control the transceiver to transmit, to a base station (BS), a first RRC state transition request message including a cause value which informs the BS that the system information related to the first RRC state is requested by the UE; and
- based on the cause value included in the first RRC state transition request message, control the transceiver to receive, from the BS, a reject message including the system information related to the first RRC state requested by the UE,
- wherein the first RRC state transition request message including the cause value is a message for requesting the system information related to the first RRC state without a state transition from the first RRC state to a second RRC state, and
- wherein a second RRC state transition request message not including the cause value is a message for requesting the state transition for the UE from the first RRC to the second RRC state.

13. The UE of claim 12, wherein, based on the cause value included in the first RRC state transition request message, the reject message is transmitted by the BS to the UE in response to the first RRC state transition request message including the cause value.

14. The UE of claim 12, wherein the system information included in the reject message is valid only in the first RRC state.

15. The method of claim 1, wherein the UE communicates with at least one of a mobile terminal, a network or autonomous vehicles other than the UE.

* * * * *